Feb. 2, 1960

G. ARSHAL 2,923,465

UNIFIED TRACKING SYSTEM

Filed Sept. 8, 1954

INVENTOR:
BY George Arshal

Feb. 2, 1960  G. ARSHAL  2,923,465
UNIFIED TRACKING SYSTEM
Filed Sept. 8, 1954  9 Sheets-Sheet 2

BY *George Arshal*
INVENTOR

Feb. 2, 1960 G. ARSHAL 2,923,465
UNIFIED TRACKING SYSTEM
Filed Sept. 8, 1954 9 Sheets-Sheet 3

BY George Arshal
INVENTOR

INVENTOR:
George Arshal

INVENTOR:
George Arshal

United States Patent Office 2,923,465
Patented Feb. 2, 1960

2,923,465
UNIFIED TRACKING SYSTEM

George Arshal, New York, N.Y.

Application September 8, 1954, Serial No. 454,737

6 Claims. (Cl. 235—61.5)

The invention is a three dimensional, vector filtering system said in the example of a tracking system. It embodies the relationships of vector calculus. These relationships apply in the dynamical descriptions of real, mechanical phenomena. The failure to instrument the vector relationships in data filtering processes, as has been the practice, causes loss or denial of information. Also, the absence of vector relationships implies a brand of kinematics that is artificial and alien to Newton's laws of motion. Since all mass objects respect the laws, processes of filtering kinematic data must also respect the laws, or else they suffer artificially induced errors.

In its execution, the invention is free of needless constructions or artifices. For example, vectorial integration is performed with respect to any reference frame. Special constraints on the motion of the reference frame are unnecessary, but they can be accommodated. Also, one reference frame is all that is absolutely necessary. The invention eliminates the necessity for resolving given vector data into other or special reference frames.

The vector filtering system acquires characterization as a tracking system primarily through the choice of a target position measurement as an input vector. The combinations presented in connection with a target position measurement also apply in connection with other input vectors. Examples of possible input vectors are aircraft velocity measurements as: (1) the air velocity obtained from an air data computer, or (2) the aircraft velocity relative to the earth that is obtained from a Doppler-radar system.

Figure 2:
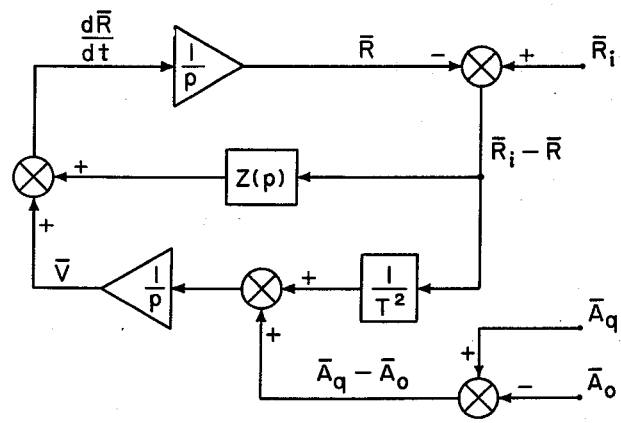
Figure 2 is a block diagram drawing the tracking system with a generalized damping operator.
Figure 3:
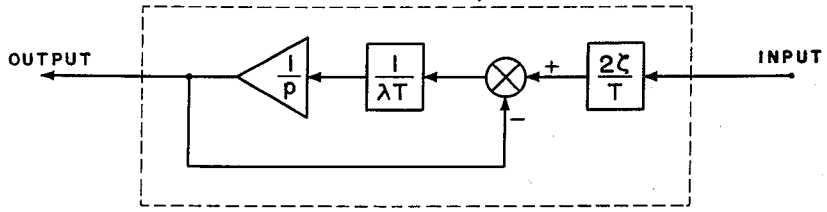

Figure 3 states a damping operator that is applicable to Figure 2.

Figure 4:
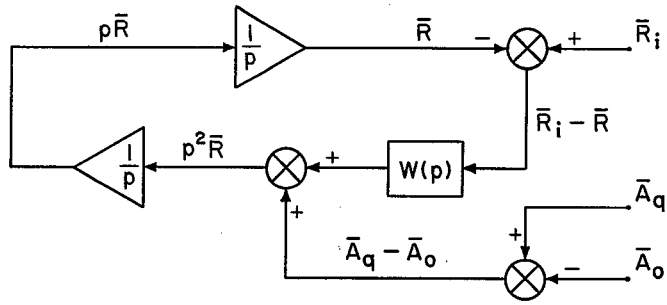

Figure 4 repeats Figure 2 in different form.

Figure 5:
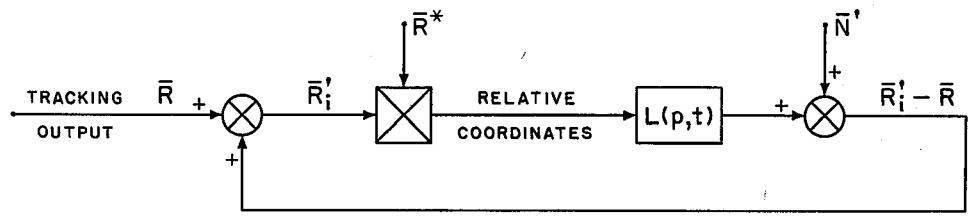

Figure 5 illustrates a technique for compensating time lag in measurement.

Figure 1:
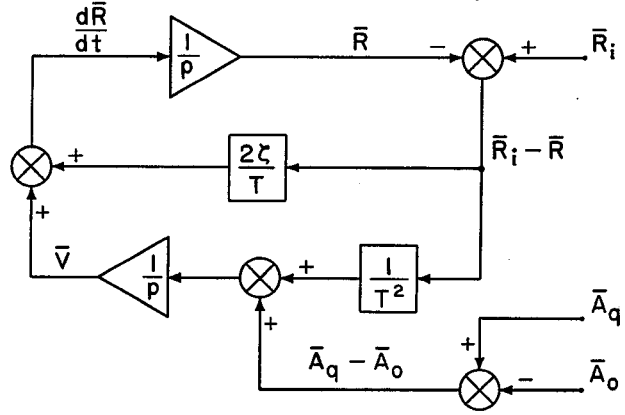
Figure 1 is a block diagram of the tracking system.
Figure 6:
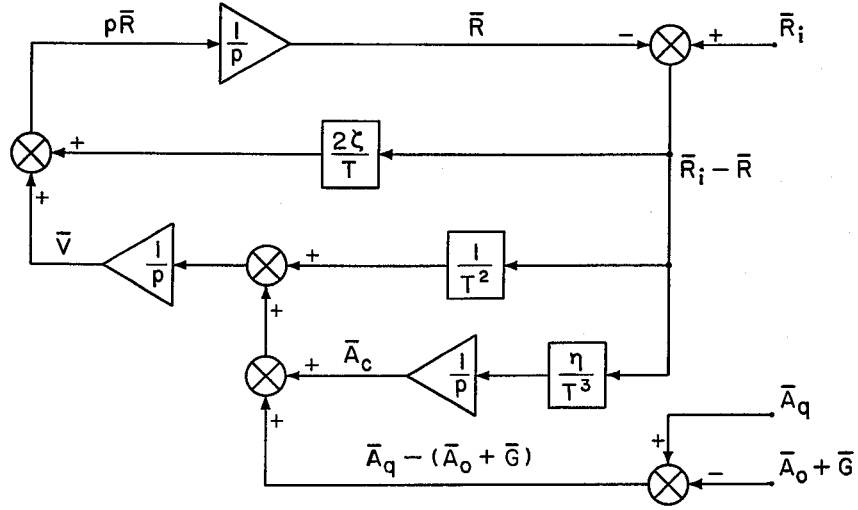

Figure 6 is a block diagram enlarging on Figure 1 to yield an output value of gravity.

Figure 7:
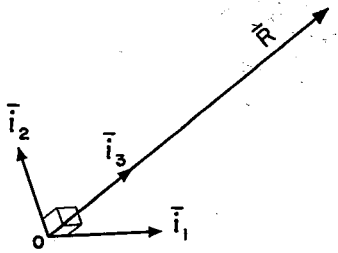

Figure 7 illustrates the geometrical interpretation belonging to a particular construction of the tracking output position vector.

Figure 8:
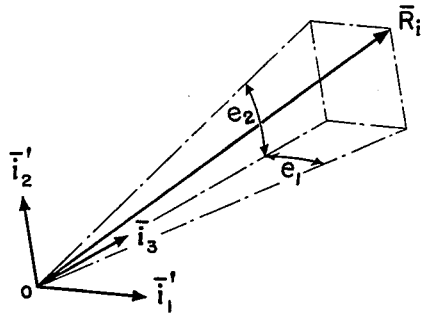

Figure 8 illustrates the geometry implied in radar data measuring target position.

Figure 9:
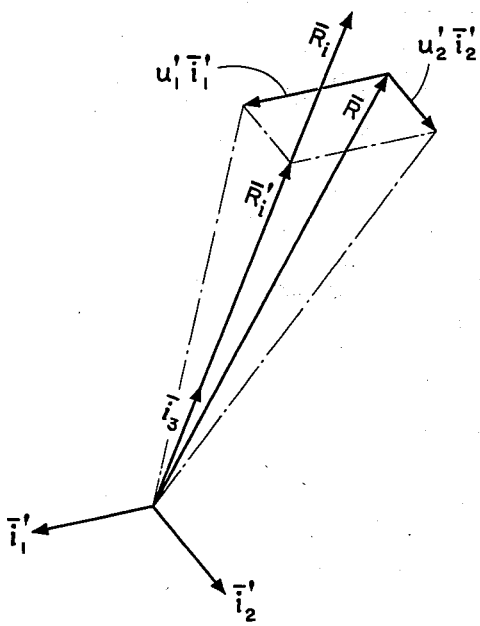

Figure 9 illustrates the implied geometry in radar ranging and manual directional measurements defining a target position.

Figure 10:
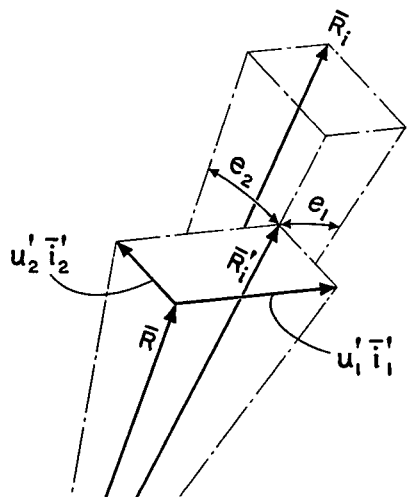

Figure 10 is a combination of Figures 8 and 9.

Figure 11A:
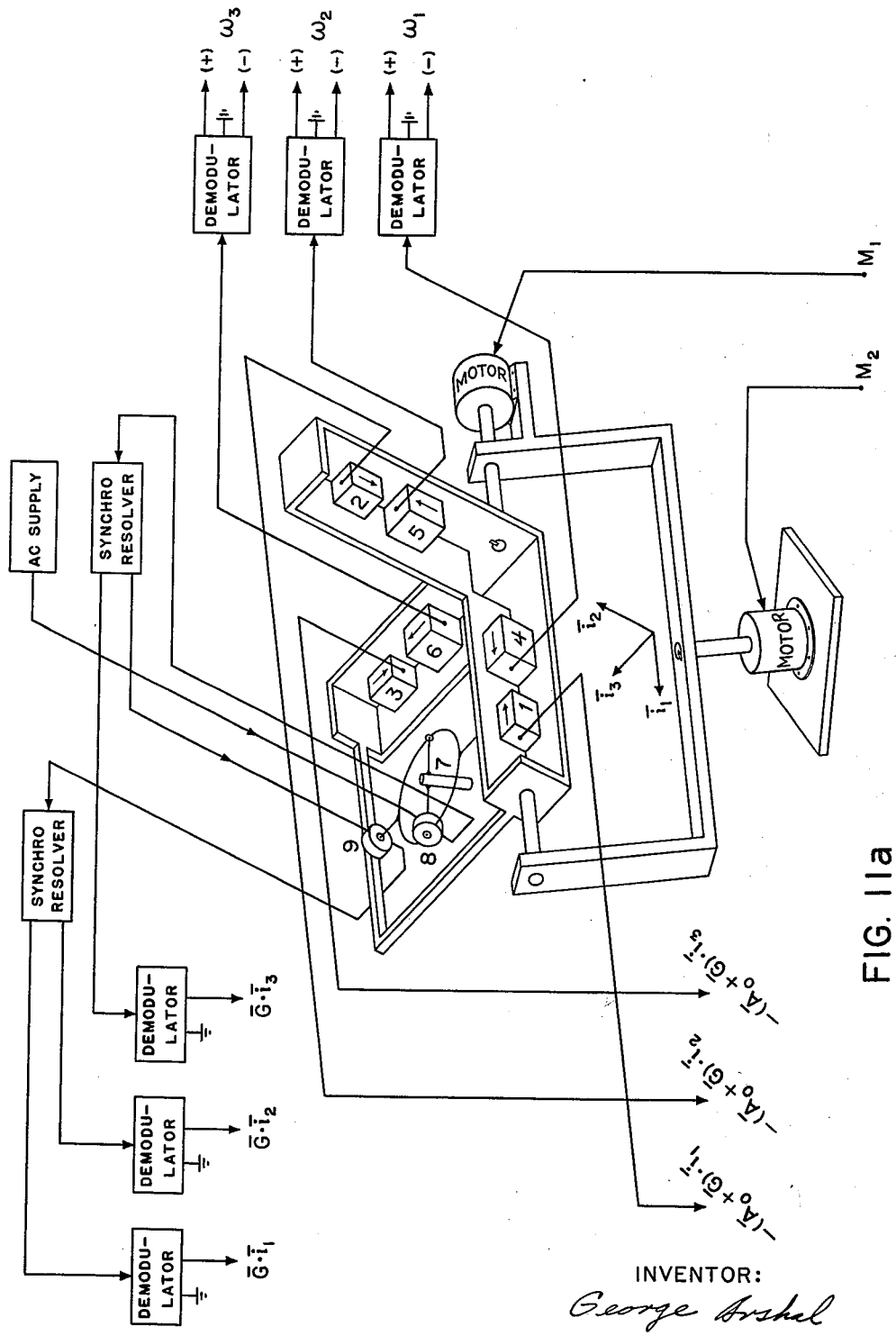

Figures 11a ... f draw an embodiment of the tracking system in accordance with Figure 1.

Mathematical symbols

Letters with bar overhead denote vector quantities.
Where the same letter appears without the bar, it represents the scalar magnitude of the vector.
Subscripts, whether letter or numeral, and superscripts (asterisks and primes) distinguish quantities in lieu of a new letter.

The symbol "∧" denotes the vector (cross) product of two vectors.

"·" denotes the scalar (dot) product of two vectors.

$p$ represents $\frac{d}{dt}$, $\frac{1}{p}$ the operator $\int dt$.

Introduction—Concepts

A tracking system produces information telling the location or direction of a remote target. To produce this information the tracking system must receive relevant measurements beforehand.

Measurements to define target direction are possible only with respect to a physical reference frame. Then angular coordinates to the target exist and their measures originate from a zero reference axis contained in the reference frame. In practice, available instrumentations measure the coordinate angles reliably when these angles stay within limits; best accuracy is realized when the angles measure around zero. It becomes necessary to keep the zero reference axis continuously oriented into the direction of the target. This procedure is descriptive of many tracking systems. The direction displayed by a physical (zero) reference axis is coerced to copy the directional information acquired by measurement.

Usually range information is as necessary as directional information. In past practice, target range has been acquired by measurement and kept distinct from the directional tracking operation. However, both can unite into one kinematic operation, the tracking of target position. A tracking position can be defined with coordinate data referred to a frame containing the zero reference axis. A tracking system utilizing the direction and range measurements to the target can control both the zero reference axis and the coordinate data of tracking position. The whole operation can be founded on vector quantities, in which direction and length merge. The vector concept also brings mathematical notation which can quickly state all the elements that apply in tracking.

Two vectors, $\bar{R}^*$ and $\bar{R}$, drawn from the origin point of tracking, can represent the target displacement and the tracking output displacement respectively. The tracking vector $\bar{R}$ is deliberately created. It is realized in mathematical terms by exhibiting a reference frame and coordinate data with respect to the frame. This vector $\bar{R}$ needs to duplicate the target vector $\bar{R}^*$. Therefore, $\bar{R}$ would become a function derived from $\bar{R}^*$. The formation of such a function is dependent on a physical realization of $\bar{R}^*$ also in terms of mathematical content. But $\bar{R}^*$ is an independent quantity representing target position. This independence means that the mathematically stated realization of $\bar{R}^*$ comes about only as measurements of the target coordinates from a physical reference frame.

$\bar{R}$ can appear as a single component along the zero axis of the reference frame in which $\bar{R}^*$ is measured. In any case, the zero reference axis can converge upon $\bar{R}$ as $\bar{R}$ approaches $\bar{R}^*$. However, such construction of $\bar{R}$ has no analytic significance once the necessity for tracking is established. It is now a restriction on realization which accommodates the measurement of target position within narrow angles.

The target coordinates, $\bar{R}^*$, can be measured with error. If the error is $\bar{N}$, the indicated target coordinates are $\bar{R}_i = \bar{R} + \bar{N}$. With measuring means such as radar, sonar or manually applied signals based on observation, $\bar{N}$ consists of random error components, or noise.

If $\bar{R}_i$ (and the angular space rate of $\bar{R}_i$'s reference frame, so measurable with rate gyros) represents all the data of measurement, $\bar{R}$ must be derived from $\bar{R}_i$, and tracking is a filtering problem. $\bar{R}$ equals $\bar{R}^*$ when it is extracted by suppressing the noise, and nothing else, in $\bar{R}_i = \bar{R}^* + \bar{N}$. But this ideal result is unattainable with only a filtering process. Perfect tracking is hardly expected in any case, but it can be sought in principle.

More information on $\bar{R}^*$ is necessary. The information that is most accessible is the acceleration of $\bar{R}^*$, that is $$\frac{d^2 \bar{R}^*}{dt^2}$$

This acceleration is the difference of the absolute (inertial) accelerations at the target and at the origin point of tracking. The acceleration of the origin is always accurately measureable; it is the acceleration detected by a set of accelerometers less the acceleration due to gravity. The acceleration of the target can be directly obtained in some cases. Friendly targets which are being tracked and guided can telemeter the measurements of their accelerations to the tracking system. Also, the accelerations are predetermined for special targets such as a freely falling body (at high altitude) or an object fixed to the earth. In other cases, the target acceleration can be simply postulated or it can be derived by filtering the sum $$\frac{d^2 \bar{R}_i}{dt^2} + \bar{A}_o$$

where $\bar{A}_o$ is the acceleration (of motion) measured at the tracking origin. The filtering can be based on likely assertions or statistical knowledge about the patterns of target acceleration.

If the acquired target acceleration is $\bar{A}_q$, the relative acceleration $$\frac{d^2 \bar{R}^*}{dt^2}$$

is known as $\bar{A}_q - \bar{A}_o$. $\bar{A}_q - \bar{A}_o$ can support $\bar{R}_i$ in generating the tracking output $\bar{R}$. Then $\bar{R}$ is less dependent on $\bar{R}_i$; the problem of filtering the noise in $\bar{R}_i$ is alleviated.

$\bar{R}$ will be formed out of vectors derived from $\bar{R}_i$ and $\bar{A}_q - \bar{A}_o$. Since $\bar{R}_i$ and $\bar{A}_q - \bar{A}_o$ are functions of time, any number of vectors are derived as $\phi(p)\bar{R}_i$ and $\psi(p)(\bar{A}_q - \bar{A}_o)$, where $\phi(p)$ and $\psi(p)$ are linear operators in which $$p \equiv \frac{d}{dt}$$

A general (not necessarily complete) functional expression for $\bar{R}$ is $$\bar{R} = f[\phi_1(p)\bar{R}_i, \phi_2(p)\bar{R}_i, \ldots \psi_1(p)(\bar{A}_q - \bar{A}_o), \ldots]$$

This relationship implies further measurements describing the state of a tracking system. The total derivative operator, $$\frac{d}{dt}$$

or $p$, gives the rate of change of a vector relative to a rigid frame that is non-rotating in space. In order to take a vector through an operator $\phi(p)$, or $\psi(p)$, in a moving frame of reference, the reference frame's angular velocity relative to space must be known. Measurements of the angular rate or else constraints or controls on the angular motion of the reference frame are necessary. Also, a vector can be operated on in a particular frame of reference only if it is known by its components in that frame of reference. Since every operation must yield a vector, it is implied that the relative orientations are known among all reference frames taking part in the relationship $$\bar{R} = f[\phi_1(p)\bar{R}_i, \phi_2(p)\bar{R}_i, \ldots \psi_1(p)(\bar{A}_q - \bar{A}_o), \ldots]$$

The angles, or direction cosines, between frames must be applied in transforming a vector's representation from one reference frame to another.

The relationship $$\bar{R} = f[\phi_1(p)\bar{R}_i, \phi_2(p)\bar{R}_i, \ldots \psi_1(p)(\bar{A}_o - \bar{A}_q), \ldots]$$

carries the knowledge of:

(1) The measured target position,
(2) The tracking output position,
(3) The absolute accelerations of the target and the origin point of tracking acquired independently,
(4) The orientations of all the reference frames with respect to one another,
(5) The angular velocities of these frames in space.

The relationship completely accounts for the kinematic state of the tracking system with respect to inertial space. The derivation of $\bar{R}$ form $\bar{R}_i$, $\bar{A}_q$ and $\bar{A}_o$ will admit a comprehensive solution.

The tracking theory

A tentative step in formulating the tracking system will be to treat $\bar{A}_q - \bar{A}_o$ as the accurate value of $p^2\bar{R}^*$, though this is so only in exceptional circumstances. The double integral of $\bar{A}_q - \bar{A}_o$ then gives $$\int_0^t \int_0^t (\bar{A}_q - \bar{A}_o) dt^2 = \bar{R}^* - (\bar{C}_1 t + \bar{C}_2) \qquad (1)$$

where $\bar{C}_1$ and $\bar{C}_2$ are constant vectors. A vector $\bar{R}_x$ is added to this quantity so that the sum becomes the tracking output $\bar{R}$:

$$\bar{R}_x + \int_0^t \int_0^t (\bar{A}_q - \bar{A}_o) dt^2 = \bar{R} = \bar{R}^* + \bar{R}_x - (\bar{C}_1 t + \bar{C}_2) \qquad (2)$$

$\bar{R}$ achieves its desired value when $\bar{R}_x = \bar{C}_1 t + \bar{C}_2$. The difference between $\bar{C}_1 t + \bar{C}_2$ and $\bar{R}_x$ is, by the right side equality in (2), $$\bar{R}^* - \bar{R} = (\bar{C}_1 t + \bar{C}_2) - \bar{R}_x \qquad (3)$$

The measure of this difference is available as $\bar{R}_i - \bar{R}$. It can serve to generate $\bar{R}_x$ to the required value.

A double time integral of $\bar{R}_i - \bar{R}$ can sustain the vector $\bar{R}_x = \bar{C}_1 t + \bar{C}_2$ when, exclusive of noise error, $\bar{R}_i - \bar{R}$ becomes zero. The integration also attenuates the noise in $\bar{R}_i$. However, the process succeeds if it is stable. Stability is assured if both a single and double integral of $\bar{R}_i - \bar{R}$ generate $\bar{R}_x$. This is evident when these integrals substitute for $\bar{R}_x$ in the left side equality of (2). $\bar{R}$ is produced as $$\int \frac{2\zeta}{T}(\bar{R}_i - \bar{R}) dt + \int\int \frac{1}{T^2}(\bar{R}_i - \bar{R}) dt^2 + \int\int (\bar{A}_q - \bar{A}_o) dt^2 = \bar{R} \qquad (4)$$

$$\frac{2\zeta}{T} \text{ and } \frac{1}{T^2}$$

are scalar coefficients and, in general, are functions of time. The result is a damped 2nd order system. The differential equation for $\bar{R}$ is $$\left(1 + T^2 p \frac{2\zeta}{T} + T^2 p^2\right)\bar{R} = T^2(\bar{A}_q - \bar{A}_o) + \left(1 + T^2 p \frac{2\zeta}{T}\right)\bar{R}_i \qquad (5)$$

Figure 1 is a block diagram constructing Equation 4. An essential property of the system is the vectorial double integration, which feeds back $$\frac{1}{T^2}(\bar{R}_i - \bar{R})$$

and develops output displacement from $\bar{A}_q - \bar{A}_o$. The inner loop feeding back $$\frac{2\zeta}{T}(\bar{R}_i - \bar{R})$$

through single integration provides damping, and it is not the only possible damping feedback. Figure 2 represents a more general realization in which the operator $Z(p)$ can take any form consistent with a damped system. One such operator is $$Z(p) = \left(\frac{1}{1+\lambda Tp}\right)\frac{2\zeta}{T} \quad (6)$$

It has extra capacity to suppress noise but damping requirements limit this advantage and it requires extra circuitry.

A scheme for (6) is shown in Figure 3. As linear vectorial operator, it is constructed on the elementary vector operations.

Figure 4 is an equivalent form of Figure 2. $Z(p)$ and the damping requirements which $Z(p)$ must satisfy are expressed in $W(p)$ through the identity $$W(p) = \frac{1}{T^2} + pZ(p) \quad (7)$$

A difference is that Figure 4 denies the output $\bar{V}$ as isolated in Figure 2.

In every case, $\bar{R}_i$ is a measured or indicated target position. It is desirably in close time phase with the target. However, time lag can enter the process of measuring target position and in complicated manner. If the lag is significant, compensating circuitry is required as part of the tracking system. Such circuitry is best represented as belonging to the measuring system which delivers $\bar{R}_i$ or $\bar{R}_i - \bar{R}$.

Figure 5 is an illustration. It shows tracking functions that belong to the measuring system. $\bar{R}_i'$, formed as output, becomes the reference base for measuring $\bar{R}^*$. By assumption, certain of the coordinates between $\bar{R}^*$ and $\bar{R}_i'$ are measured with lag which needs to be compensated. The compensation comes in feedback adding to the output $\bar{R}$. $\bar{R}_i'$ is so constructed that $\bar{R}_i' - \bar{R}$ affects exactly those coordinates between $\bar{R}^*$ and $\bar{R}_i'$ which are measured with lag. The lagging measurements are subsequently operated on with gain to generate $\bar{R}_i' - \bar{R}$ and so are driven to zero. The operator $L(p,t)$ accounts for the lag and gain. Since $L(p,t)$ acts equally on $\bar{R}^*$ and $\bar{R}_i'$ through their relative coordinates, it forces $\bar{R}_i'$ into time phase with $\bar{R}^*$. The result is that the lagging measured coordinates are suppressed and are replaced with equivalent inphase data in the form of $\bar{R}_i' - \bar{R}$. This and the non-lagging or non-compensated coordinate measurement(s) of $\bar{R}^*$ define $\bar{R}_i$ and $\bar{R}_i - \bar{R}$ for the tracking system.

Notably the manual systems of measurement require lag compensation. These systems have an observer performing the functions of $L(p,t)$. They are described under instrumentation.

In discussion that follows, the characteristics of the tracking system are described with reference to Figure 1, with $\bar{R}_i$ equal to $\bar{R}^* + \bar{N}$. Any of the allowable variations on Figure 1 produce secondary differences of result.

If the tracking error is called $$\overline{\Delta R} = \bar{R}^* - \bar{R} \quad (8)$$

$\bar{R}_i - \bar{R} = \overline{\Delta R} + \bar{N}$ and Figure 1 yields the equation $$\left(1 + T^2 p\frac{2\zeta}{T} + T^2 p^2\right)\overline{\Delta R}$$
$$= T^2[p^2\bar{R}^* - (\bar{A}_q - \bar{A}_o)] - \left(1 + T^2 p\frac{2\zeta}{T}\right)\bar{N} \quad (9)$$

The system develops the tracking velocity $$\frac{d\bar{R}}{dt}$$

but the output $\bar{V}$ from the first stage of integration (Figure 1) contains less noise and is better suited to most tracking applications. The equation for $\bar{V}$ is $$(1+2\zeta Tp+pT^2p)\bar{V}=p\bar{R}^*+(2\zeta T+pT^2)(\bar{A}_q-\bar{A}_o)+p\bar{N} \quad (10)$$

The difference $$\overline{\Delta V}=p\bar{R}^*-\bar{V} \quad (11)$$

is given by $$(1+2\zeta Tp+pT^2p)\overline{\Delta V}=(2\zeta T+pT^2)[p^2\bar{R}^*-(\bar{A}_q-\bar{A}_o)]-p\bar{N} \quad (12)$$

The preceding differential equations are linear vector equations. The vectors can be represented by their components in a reference frame maintaining constant space orientation, and the equations show that the system is linear in rectilinear coordinates.

The tracking performance is independent of target speed. Noise $\bar{N}$ and differences of acceleration between $p^2\bar{R}^*$ and $\bar{A}_q-\bar{A}_o$ cause the tracking errors $\overline{\Delta R}$ and $\overline{\Delta V}$. If $\bar{A}_q-\bar{A}_o$ accurately gages the acceleration $p^2\bar{R}^*$, the equation parameter T, the coefficient of time lag for the system, can in theory be infinite, so that the tracking errors are zero. This is the maximum result theoretically achievable under any circumstance. A filter, to wholly suppress random noise, always requires an infinite coefficient of time lag. In practice, it is sufficient to have T large in relation to the existing noise level.

T is desirably or even necessarily a variable that changes with noise level. The levels of noise $\bar{N}$ are higher as the target ranges are longer. However, a $T(t)$ or $T(R_i)$ might well be of less than first degree variation. The homogeneous equations for the tracking errors, $\overline{\Delta R}$ and $\overline{\Delta V}$, must have solutions that make a satisfactory approach to zero steady state.

The other system parameters as $\zeta$ or $\lambda$ (Figure 3) are largely fixed by damping and performance requirements.

In most tracking applications, $\bar{A}_q$ is not available as a direct measure of the target's acceleration. When $p^2\bar{R}^*-(\bar{A}_q-\bar{A}_o) \neq 0$, acceleration errors enter $\overline{\Delta R}$ and $\overline{\Delta V}$, and T must be a compromise. Small T reduces acceleration error; large T reduces noise error. A T that varies with noise level is essential for good compromise.

An arbitrary but convenient, practical value that can often be assigned to $\bar{A}_q$ is zero. Tracking errors then result from $p^2\bar{R}^*+\bar{A}_o$ which is the absolute acceleration of the target.

$\bar{A}_o$, the absolute acceleration of the tracking station (the origin point of tracking), is always measurable with accelerometers, but the measurement includes $\bar{G}$, the acceleration due to gravity. $\bar{G}$ can be corrected for outright if a vertical reference or equivalent information is supplied. An alternative, when such correction is not practical or expedient, is to permit the total measured acceleration $\bar{A}_o+\bar{G}$ to enter the tracking system as $\bar{A}_o$, and compensate for $-\bar{G}$ by generating a third "constant" of integration in the system. In Figure 6, the triple integral feedback of $$\frac{\eta}{T^3}(\bar{R}_i-\bar{R})$$

will sustain the vector $\bar{A}_c=\bar{G}$. However, $\eta$ must be quite less than $\zeta$, so $\bar{A}_c$ requires a longer settling time than the rest of the system. Another alternative is just to enter $\bar{A}_o+\bar{G}$ in the tracking system without providing correction or compensation for $\bar{G}$. This procedure would be acceptable in some tracking applications—for example, homing missiles.

Friendly targets present the occasions when the tracking system can receive a measured value $\bar{A}_q$. The target must radio its acceleration, transmitting three components whose directions are known to the tracking station. This implies stable reference frames at both the target and the tracking station. Then the tracking system can take the difference of absolute accelerations, $\bar{A}_q - \bar{A}_o$, which accurately states $p^2\bar{R}*$.

The transmission of target acceleration to the tracking station by telemeter has purpose beside accurate tracking. $\bar{A}_q - \bar{A}_o = p^2 \bar{R}*$ and by substitution in Equations 5 and 10.

$$\bar{R} = \bar{R}* + \frac{\left(1 + T^2 p \frac{2\zeta}{T}\right)\bar{N}}{1 + T^2 p \frac{2\zeta}{T} + T^2 p^2} \quad (13)$$

$$\bar{V} = p\bar{R}* + \frac{p\bar{N}}{1 + 2\zeta T p + p T^2 p} \quad (14)$$

The tracking outputs $\bar{R}$ and $\bar{V}$ are completely free of lag in response to actual target position and velocity. This is important when tracking proceeds for the purpose of guiding a target. Command signals sent to the target depend on the tracking outputs and return $\bar{R}*$ and $p\bar{R}*$ as feedback. If $\bar{A}_q$ were not measured information transmitted to the tracking system, $\bar{R}*$ and $p\bar{R}*$ would feed back through the large lags which act on $\bar{N}$ and $p\bar{N}$ in Equations 13 and 14. This would handicap stable, effective control of the target. When the tracking system receives $\bar{A}_q$ as a measurement, the target control process is independent of tracking system lags.

The same observation applies to a control system that guides the tracking station's movement relative to a target. $\bar{R}*$ can be expressed as a difference $$\bar{R}_a - \bar{R}_o = \bar{R}* \quad (15)$$

where $\bar{R}_a$ and $\bar{R}_o$ are displacements of the target and the tracking station from any stated point. The point is fixed to inertial space by the condition $$p^2 \bar{R}_o = \bar{A}_o \quad (16)$$

From (15) to (16), Equations 5 and 10 are:

$$\bar{R} = \frac{\left(1 + T^2 p \frac{2\zeta}{T}\right)(\bar{R}_a + \bar{N}) + T^2 \bar{A}_q}{1 + T^2 p \frac{2\zeta}{T} + T^2 p^2} - \bar{R}_o \quad (17)$$

$$\bar{V} = \frac{p(\bar{R}_a + \bar{N}) + (2\zeta T + p T^2)\bar{A}_q}{1 + 2\zeta T p + p T^2 p} - p\bar{R}_o \quad (18)$$

The motion of the tracking station is independent of the tracking dynamics and vice versa. The measurement $\bar{A}_o$ is responsible.

Instrumentation

In any functional apparatus, as a tracking system, a vector consists in three components (some may be zero) referred to a physical reference frame. The reference frame is an orthogonal triad. The components are defined by physical representations of data as either the components themselves or other coordinates from which they can be derived.

Any one vectorial operation requires all input and output vectors pertinent to the operation to be expressed as their components on the same triad of reference.

The operations of vector algebra proceed by their definitions as ordinary algebraic computations among the orthogonal components of the vectors involved and possibly other scalars.

The vectorial integration with respect to time results by satisfying the relation $$\frac{d}{dt}(\text{vector output}) = (\text{vector input}) \quad (28)$$

The total derivative operator is $$\frac{d}{dt} = \left(\frac{\delta_J}{\delta t} + \bar{\omega}_J \wedge \right) \quad (29)$$

$\frac{\delta_J}{\delta t}$ operates as differentiator giving the rate of change of a vector relative to a reference frame J (J represents an orthogonal triad of unit vectors $\bar{j}_1$, $\bar{j}_2$ and $\bar{j}_3$, which directions are exhibited or defined on a rigid object). $\bar{\omega}_J$ is the angular space rate of J and $\bar{\omega}_J \wedge$ operates on a vector referred to J to give its rate of change due to rotation of J. The vector derivatives or integrals can be produced if the component angular space rates are known, controlled or measured.

If the reference frame maintains constant space orientation or if it is stabilized with respect to the earth (angular space rates the order of earth rotation can sometimes be neglected), vectorial integration reduces to the scalar integrations of three rectilinear components.

Control of the reference frame occurs in integrating to generate the output $\bar{R}$. A reference frame (Figure 7) that contains the zero reference axis of the measurements defining $\bar{R}_i$ is taken for the integration. $\bar{i}_1$, $\bar{i}_2$ and $\bar{i}_3$ are unit vectors forming an orthogonal triad; the zero direction is $\bar{i}_3$. $\bar{R}$ is constructed as $$\bar{R} \cdot \bar{i}_1 = \bar{R} \cdot \bar{i}_2 = 0; \quad \bar{R} = R\bar{i}_3 \quad (30)$$

From Figure 2, $$\frac{d\bar{R}}{dt} = V + Z(p)(\bar{R}_i - \bar{R}) = \bar{V}_r \quad (31)$$

where, to simplify notation, $\bar{V}_r \equiv \bar{V} + Z(p)(\bar{R}_i - \bar{R})$. $\bar{V}_r$ must be expressed as its components in the triad $\bar{i}_1$, $\bar{i}_2$, $\bar{i}_3$:

$$\bar{V}_r = V_{r1}\bar{i}_1 + V_{r2}\bar{i}_2 + V_{r3}\bar{i}_3 \quad (32)$$

Then (31), by (29) and (30), becomes $$\frac{dR}{dt}\bar{i}_3 - R(\bar{\omega}_I \cdot \bar{i}_1)\bar{i}_2 + R(\bar{\omega}_I \cdot \bar{i}_2)\bar{i}_1 = V_{r3}\bar{i}_3 + V_{r2}\bar{i}_2 + V_{r1}\bar{i}_1 \quad (33)$$

$\omega_I$ represents the angular space rate of the $\bar{i}_1$, $\bar{i}_2$, $\bar{i}_3$ (or "I—") triad. (33) gives the three component relations $$R = \int V_{r3} dt \quad (34)$$

$$\bar{\omega}_I \cdot \bar{i}_1 = -\frac{V_{r2}}{R} \quad (35)$$

$$\bar{\omega}_I \cdot \bar{i}_2 = \frac{V_{r1}}{R} \quad (36)$$

(34) is computed. The right sides of (35) and (36) are then computed and must become actual angular rates of the reference frame.

Rate gyros can measure $\omega_I \cdot \bar{i}_1$ and $\omega_I \cdot \bar{i}_2$. Signals computed as $$-\frac{V_{r2}}{R} - \bar{\omega}_I \cdot \bar{i}_1$$

and $$\frac{V_{r1}}{R} - \bar{\omega}_I \cdot \bar{i}_2$$

can drive the reference frame to zero themselves. Another procedure is to apply the gyros as reference elements, precess them at the rates $$-\frac{V_{r2}}{R} \text{ and } \frac{V_{r1}}{R}$$

and coerce the reference frame to follow up the gyro positions. The angular velocities (35) and (36) can be produced without gyros in the presence of a second reference frame which maintains constant space orientation or is earth stabilized. Angles measured between the I-triad and the fixed reference frame would be driven with the necessary movement.

The control process around the I-triad introduces extraneous dynamics in the tracking system. However, the controls must produce a tight, fast follow-up action. The dynamic lags are negligible.

From (29), the general set of relations for the vector derivatives or integrals on any reference frame is $$\frac{dX_1}{dt}+\omega_2 X_3-\omega_3 X_2=Y_1$$

$$\frac{dX_2}{dt}+\omega_3 X_1-\omega_1 X_3=Y_2$$

$$\frac{dX_3}{dt}+\omega_1 X_2-\omega_2 X_1=Y_3 \qquad (37)$$

$\omega_1$, $\omega_2$ and $\omega_3$ are the reference frame's angular velocity components in orthogonal directions 1, 2, 3. Given these and the vector $\bar{X}$ by its components along 1, 2, 3, the left sides of (37) compute the components of $$\bar{Y}=\frac{d\bar{X}}{dt}$$

If $\bar{Y}$ is the input, the components of $\bar{X}=\int \bar{Y}dt$ are computed according to the transformation of (37) into the set $$X_1=\int(Y_1+\omega_3 X_2-\omega_2 X_3)dt$$
$$X_2=\int(Y_2+\omega_1 X_3-\omega_3 X_1)dt \qquad (38)$$
$$X_3=\int(Y_3+\omega_2 X_1-\omega_1 X_2)dt$$

Whenever two or more reference frames take part in the operations that make up the system, component resolvers are necessary to produce the coordinate transformation of a vector as $$X_\nu=\sum_{\mu=1}^{3}(\bar{j}_\nu\cdot\bar{j}_\mu)X_\mu, \quad \nu=1, 2, 3 \qquad (39)$$

The $(\bar{j}_v\cdot\bar{j}_\mu)$'s are direction cosines between axes in a J'-triad and a J-triad. (39) gives the components of $\bar{X}$ for the J'-triad.

Measurements defining $\bar{R}_i$ or $\bar{R}_i-\bar{R}$ or their equivalent can come by Radar, Sonar, infra-red detection, manually applied signals based on target observation, or other possible means, also by combinations of these means.

The automatic systems of measurement usually define $\bar{R}_i$ directly, in coordinates of angle and range (Figure 8). The triad $\bar{i}_1'$, $\bar{i}_2'$, $\bar{i}_3$ ($\bar{i}_3$ is the zero reference direction, Figure 7) is on the measuring apparatus. Angles $e_1$ and $e_2$ in the planes $\bar{i}_1'$, $\bar{i}_3$ and $\bar{i}_2'$, $\bar{i}_3$ project the direction of $\bar{R}_i$. These angles and range $R_i$ are the measurement data.

Whenever the indicated target position consists entirely as such automatic measurement and the system is tracking steadily, the output $\bar{R}$ must exist as a single component along the zero reference axis. Then $\bar{i}_3$ points toward the target with most accuracy and $e_1$ and $e_2$ are small. The vector expressions obtained with the coordinate measurements are $$\bar{R}_i=R_i e_1 \bar{i}_1'+R_i e_2 \bar{i}_2'+R_i \bar{i}_3 \qquad (40)$$

and $$\bar{R}_i-\bar{R}=R_i e_1 \bar{i}_1'+R_i e_2 \bar{i}_2'+(R_i-R)\bar{i}_3 \qquad (41)$$

(41) suggests, as one variation for the coefficient of time lag of the tracking system, that $$T=\sqrt{\frac{R_i}{K}} \qquad (42)$$

where K is a constant. Then, $$\frac{1}{T^2}(\bar{R}_i-\bar{R})=K\left(e_1\bar{i}_1'+e_2\bar{i}_2'+\frac{R_i-R}{R_i}\bar{i}_3\right) \qquad (43)$$

The combination of manual signals and Radar range data can supply $\bar{R}_i$. Two indicated positions are produced through measurement. Manual operation accounts for the first one, called $\bar{R}_i'$ (Figure 9). Signals $u_1'\bar{i}_1'$ and $u_2'\bar{i}_2'$ manually generated by an observer and added to the output $\bar{R}$ produce $\bar{R}_i'$. Cross axes on the observer's sighting or target viewing apparatus define $\bar{i}_1'$ and $\bar{i}_2'$. The zero reference direction $\bar{i}_3$ and $\bar{R}_i'$ are constrained to each other by construction. The observer must have a lever or handlebar free to displace in two directions that correlate with $\bar{i}_1'$ and $\bar{i}_2'$. He generates $u_1'$ and $u_2'$ by positioning such handlebar as necessary to point $\bar{i}_3$ at the target.

The Radar range measurement and $\bar{i}_3$ subsequently define an $\bar{R}_i$. The result requires that the zero reference direction of the Radar assembly coincide with $\bar{i}_3$ defined on the target viewing apparatus. Then the range measurement $R_i$ gives $$\bar{R}_i=R_i\bar{i}_3 \qquad (44)$$

Also, from Figure 9, $$\bar{R}_i-\bar{R}=u_1'\bar{i}_1'+u_2'\bar{i}_2'+(R_i-R_i')\bar{i}_3 \qquad (45)$$

The combination of manual and Radar measurements necessarily applies in Radar bombing systems. The manual operation trains the Radar on a surface target. The range $R_i$ is the distance to the Radar beam's ground interception point.

If, together with the manual and range data, automatic angle data is available as measurement, Figure 9 can widen into Figure 10. The automatic measurements define $\bar{R}i$ (Figure 10). As a convenience, the reference frames for $\bar{R}_i'$ and $\bar{R}_i$ are assumed fully coincident. (40) expresses $\bar{R}_i$. Its difference with $\bar{R}$ is $$\bar{R}_i-\bar{R}=(u_1'+R_i e_1)\bar{i}_1'+(u_2'+R_i e_2)\bar{i}_2'+(R_i-R_i')\bar{i}_3 \qquad (46)$$

(46) results from superimposed manual and automatic measurements. However, the automatic measurements, so long as they are complete, override the manual signals. The manual operation simply moves the reference frame and does not change $\bar{R}_i$ or $\bar{R}_i-\bar{R}$. (46) would normally arise in transition between modes of operation. When $u_1'$ and $u_2'$ are cut out, the output $\bar{R}$ (Figure 10) lies along $\bar{i}_3$ as required.

(46) is also realized with an automatic scheme. Signals $e_1$ and $e_2$ and a pair of operators can supersede (or support) manual operation as means of generating $u_1'$ and $u_2'$. As with manual operation, the resulting movement or control of $\bar{i}_3$ (Figure 10) does not affect the tracking process. Its use during initial transient periods forestalls chance of the Radar beam losing the target.

In the absence or omission of any automatic measurements, angle or range, the tracking system retains manual operation with a constant introduced as range $R_i$ (Figure 9). This mode of operation is useful and adequate for slewing the tracking system onto a target or for conducting manually controlled search.

The summing operation $$\bar{R}_i'=\bar{R}+\bar{U}' \qquad (47)$$

where $$\bar{U}'=u_1'\bar{i}_1'+u_2'\bar{i}_2' \qquad (48)$$

is performed at the derivative stage:

$$\frac{d\bar{R}_i'}{dt}=\frac{d\bar{R}}{dt}+\frac{d\bar{U}'}{dt} \qquad (49)$$

if $$\frac{d\bar{R}_i'}{dt}$$

is to be integrated into a single component directing the output reference frame.

$$\frac{d\bar{U}'}{dt}$$

is computed and expressed with respect to the output reference frame, and $\bar{V}_r$ (Equation 31) expressed likewise is entered as $$\frac{d\bar{R}}{dt}$$

Then the integration of (49) yields $\bar{R}_i'$ as $R_i'\bar{i}_3$ and is analogous with the process establishing relations (34), (35) and (36). The integration does not bypass the output $\bar{R}$. $\bar{R}$ is explicitly represented in $\bar{R}_i'-\bar{U}'$.

The system performs three dimensional manual tracking when it is instrumented with an optical range-finder. With $i_1'$, $i_2'$, $i_3$ the axes of the rangefinder, a set of manual signals as $$\bar{U} = u_1 \bar{i}_1' + u_2 \bar{i}_2' + u_3 \bar{i}_3 \quad (50)$$

add to the output $\bar{R}$ to give $$\bar{R}_i = \bar{R} + \bar{U} \quad (51)$$

$\bar{R}_i$ sets the range and points the zero direction $\bar{i}_3$ for the rangefinder. The system must be equipped with a handle and mechanism for generating a three dimensional displacement and its three components. The component displacements generate $u_1$, $u_2$ and $u_3$ as the observer positions the handle to bring $\bar{R}_i$ upon the target.

These manual measurements also suggest (42) as the variation for the tracking system's lag coefficient. The component displacements can tap the signals $u_1$, $u_2$, $u_3$ linearly from voltage sources energized proportional to $R_i$. Then the displacements themselves are inversely proportional to $R_i$. This sensitivity for the displacement handle manipulations corresponds with observational sensitivity to range and area under view. With $$T^2 = \frac{R_i}{K}$$

the handle displacements compute $$\frac{1}{T^2}(\bar{R}_i - \bar{R}) = K\frac{\bar{U}}{R_i} \quad (52)$$

Example of instrumentation

Figure 11B:
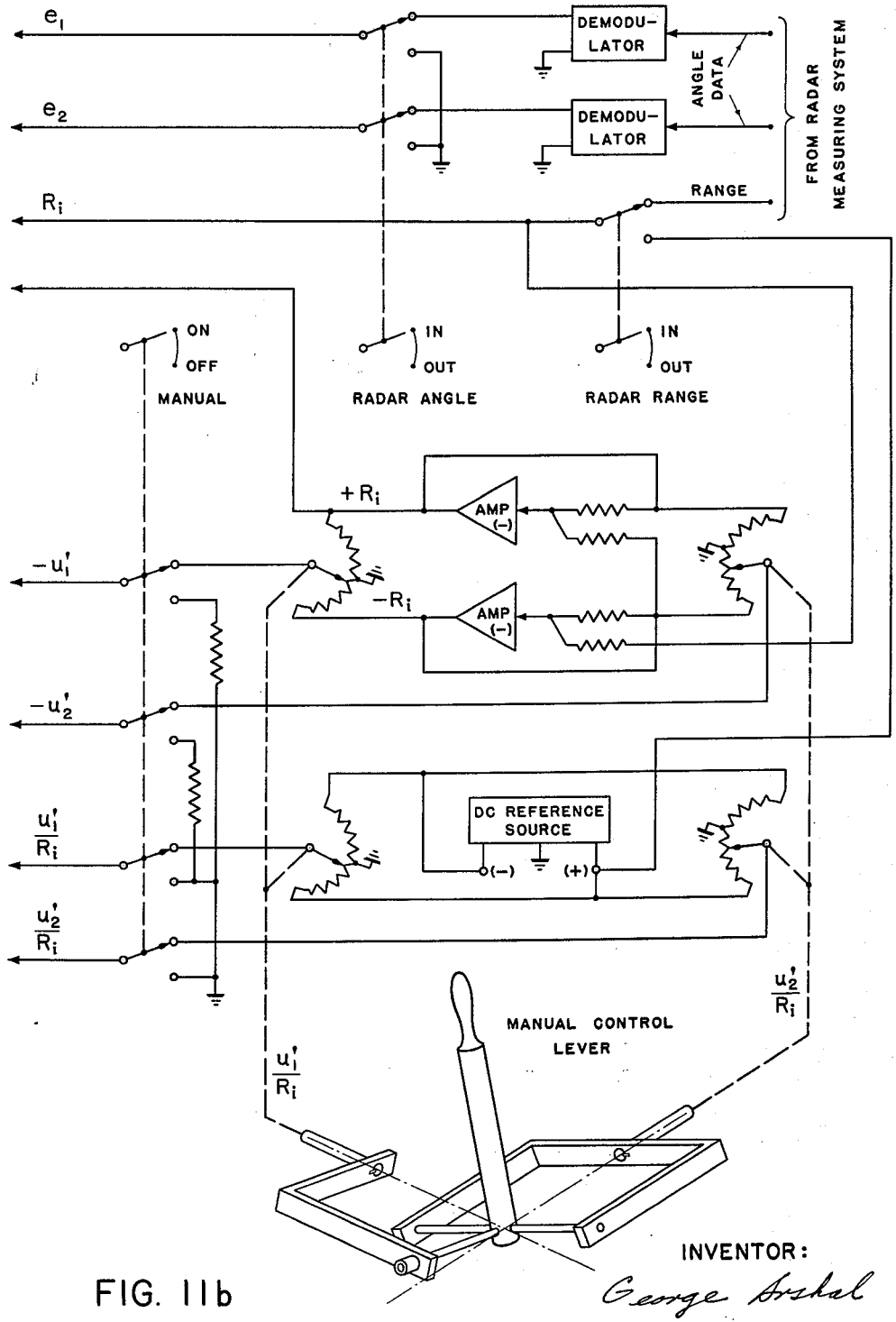

Figures 11a, 11b, ... 11f compose a layout of instrumentation for a Radar and manual tracking system modeled on Figure 1. It accommodates the following modes of operation: fully automatic, fully manual, partly automatic and partly manual, or fully automatic on top of manual operation. The last mode is illustrated (Figure 11b) because it takes in all the computations. With $$T = \sqrt{\frac{R_i}{K}}$$

these computations are $$\frac{1}{T^2}(\bar{R}_i - \bar{R}) = \frac{K}{R_i}(\bar{U}' + \bar{R}_i - \bar{R}_i') \quad (53)$$

$$\frac{2\zeta}{T}(\bar{R}_i - \bar{R}) = \frac{2\zeta\sqrt{K}}{\sqrt{R_i}}(\bar{U}' + \bar{R}_i - \bar{R}_i') \quad (54)$$

$$\bar{V} = \int \left[\frac{1}{T^2}(\bar{R}_i - \bar{R}) + (\bar{A}_q - \bar{A}_o)\right] dt \quad (55)$$

$$\bar{R}_i' = \int \left[\bar{V} + \frac{2\zeta}{T}(\bar{R}_i - \bar{R}) + \frac{d\bar{U}'}{dt}\right] dt \quad (56)$$

The instrumentation performs all the vectorial operations with respect to one reference frame. The reference frame is pictured in Figure 11a. It represents the axes of the antenna mount, also the coincident axes of target viewing apparatus. The axes are labeled $\bar{i}_1$, $\bar{i}_2$, $\bar{i}_3$. They are the same as $\bar{i}_1'$, $\bar{i}_2'$, $\bar{i}_3$ in Figure 10 and locate the Radar measurements, $e_1$, $e_2$, $R_i$, and the manual measurements, $u_1'$, $u_2'$, the same way. Boxes 1, 2, 3 and 4, 5, 6 mounted on the antenna frame are accelerometers and rate gyros respectively. The accelerometers deliver D.C. voltage outputs proportional to $$-(\bar{A}_0 + \bar{G}) \cdot \bar{i}_1, \quad -(\bar{A}_0 + \bar{G}) \cdot \bar{i}_2 \text{ and } -(\bar{A}_0 + \bar{G}) \cdot \bar{i}_3$$

The rate gyros deliver A.C. voltage measurements of $\omega_I \cdot \bar{i}_1 = \omega_1$, $\omega_I \cdot \bar{i}_2 = \omega_2$ and $\omega_I \cdot \bar{i}_3 = \omega_3$. These are demodulated to give proportional D.C. voltages split positive and negative with respect to ground. A vertical reference unit, 7, 8, 9, is mounted on the antenna frame. 7 depicts the vertical reference element; 8 and 9 are synchro pickoffs. Synchro resolvers fed by 8 and 9 break up an A.C. voltage input into three components proportional to the direction cosines between 7 and $\bar{i}_1$, $\bar{i}_2$, $\bar{i}_3$. These signals are demodulated and applied as the components of gravity acceleration, $\bar{G} \cdot \bar{i}_1$, $\bar{G} \cdot \bar{i}_2$, $\bar{G} \cdot \bar{i}_3$, which cancel the presence of $\bar{G}$ in the accelerometer measurements.

The instrumentation is primarily D.C., so the A.C. signals are demodulated. Among the Radar signals (Figure 11b), $R_i$ comes as a D.C. measurement, $e_1$ and $e_2$ require demodulation.

The notations of computed or measured quantities in Figures 11a ... f omit constants of proportionality. The physical statement of a variable implies a scale constant. The instrumentation is readily adjusted for the scaling of signal constants and computations with the values placed on summing resistors of amplifiers, voltage reference levels, gearing ratios of mechanical connections, etc.

Figure 11b shows circuitry for generating the manual signals. Linear potentiometers across potentials $+R_i$ and $-R_i$ (potentials so varying through a scale constant) are positioned with the manual control lever and yield voltages $-u_1'$ and $-u_2'$. The lever displacements are $$\frac{u_1'}{R_i} \text{ and } \frac{u_2'}{R_i}$$

and tap equivalent voltages from potentiometers placed across equal and opposite, constant potentials.

Figure 11C:
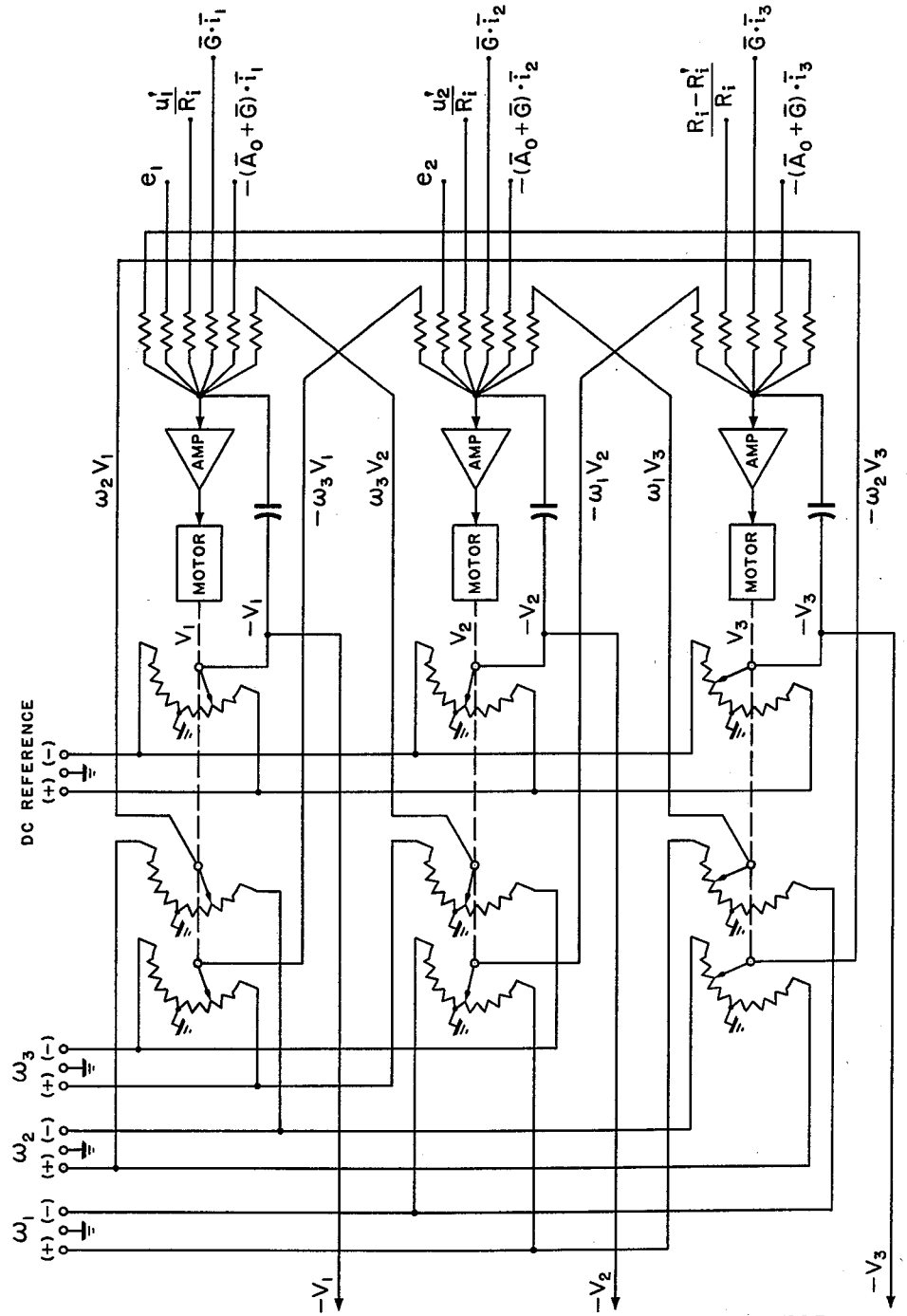

Figure 11c performs the vectorial integration (55). It consists in the three integrations (Equations 38):

$$\begin{array}{l} V_1 = \int (Y_1 + \omega_3 V_2 - \omega_2 V_3) dt \\ V_2 = \int (Y_2 + \omega_1 V_3 - \omega_3 V_1) dt \\ V_3 = \int (Y_3 + \omega_2 V_1 - \omega_1 V_2) dt \end{array} \quad (57)$$

All variables refer to the $\bar{i}_1$, $\bar{i}_2$, $\bar{i}_3$ triad (Figure 11a). $Y_1$, $Y_2$, $Y_3$, as the components of input $$\bar{Y} = \frac{1}{T^2}(\bar{R}_i - \bar{R}) - \bar{A}_o$$

($\bar{A}_q$ is assigned the value zero), are composed as $$K\frac{u_1'}{R_i} + Ke_1 - (\bar{A}_o + \bar{G}) \cdot \bar{i}_1 + \bar{G} \cdot \bar{i}_1 = \left[\frac{1}{T^2}(\bar{R}_i - \bar{R}) - \bar{A}_o\right] \cdot \bar{i}_1$$

$$K\frac{u_2'}{R_i} + Ke_2 - (\bar{A}_o + \bar{G}) \cdot \bar{i}_2 + \bar{G} \cdot \bar{i}_2 = \left[\frac{1}{T^2}(\bar{R}_i - \bar{R}) - \bar{A}_o\right] \cdot \bar{i}_2$$

$$K\frac{R_i - R_i'}{R_i} - (\bar{A}_o + \bar{G}) \cdot \bar{i}_3 + \bar{G} \cdot \bar{i}_3 = \left[\frac{1}{T^2}(\bar{R}_i - \bar{R}) - \bar{A}_o\right] \cdot \bar{i}_3$$

(58)

Figure 11D:
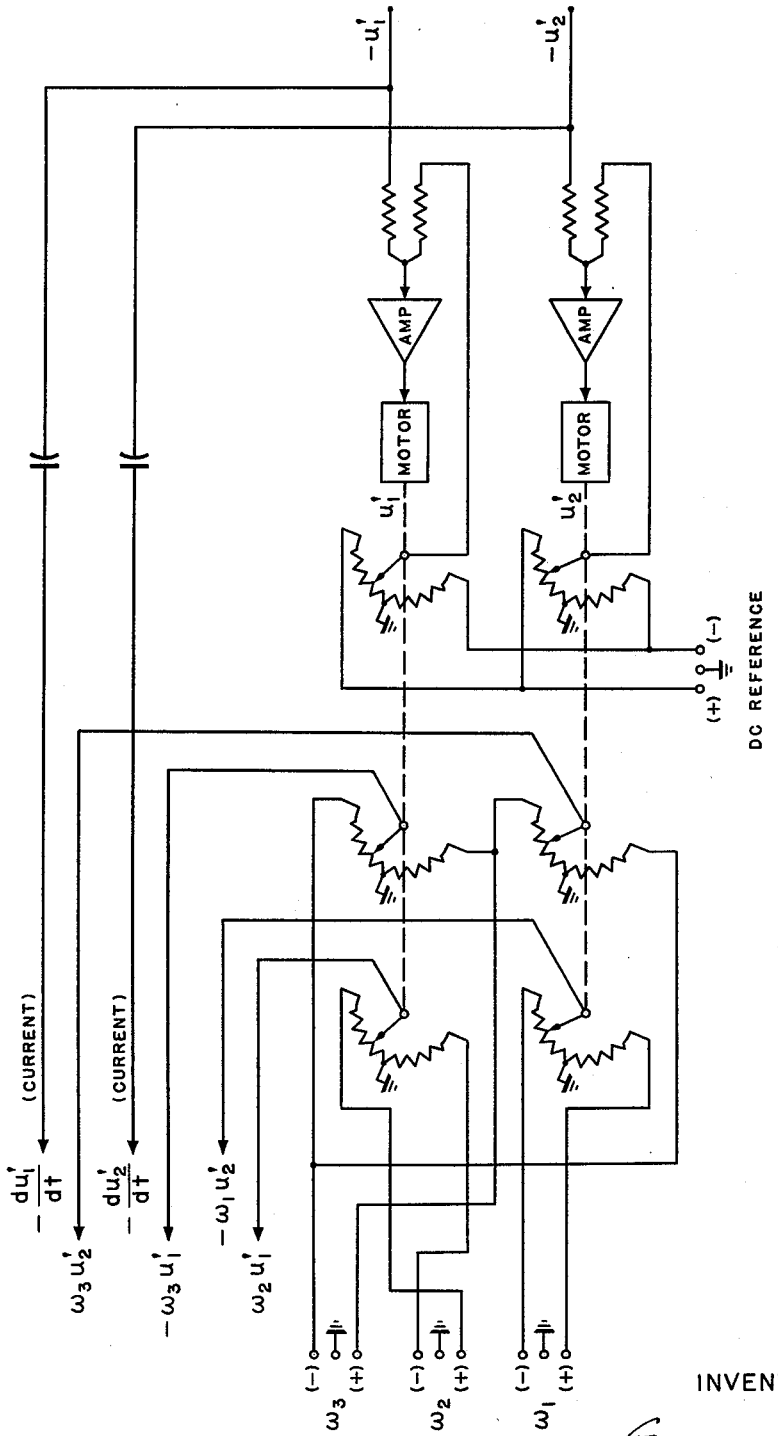
Figure 11E:
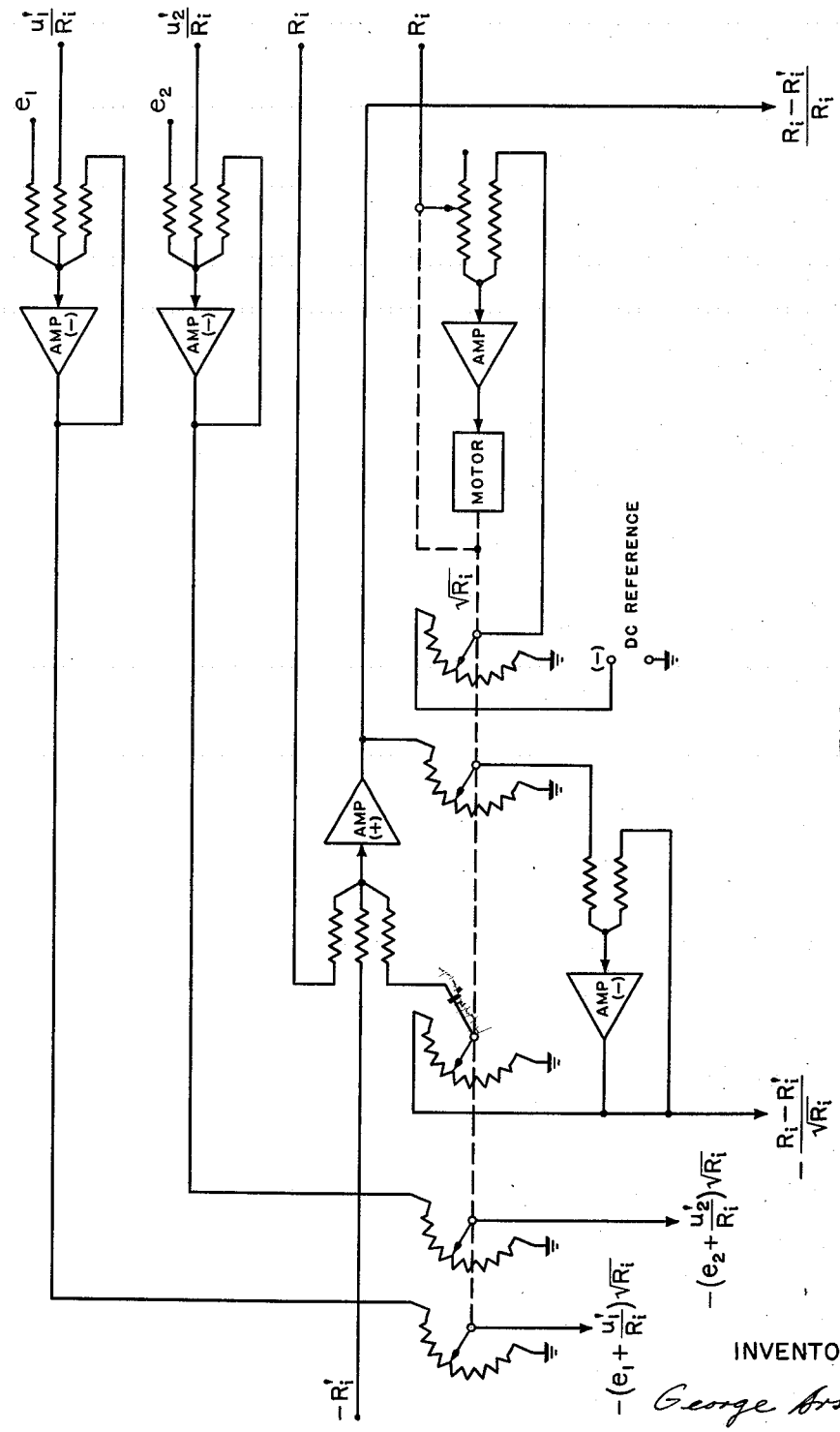

Relation (46) applies as $\bar{R}_i - \bar{R}$.

$$\frac{R_i - R_i'}{R_i}$$

is a voltage output computed in Figure 11e.

In Figure 11c, motor shaft rotations as $V_1$, $V_2$ and $V_3$ position linear potentiometers and effect multiplication of the voltages $\pm\omega_1$, $\pm\omega_2$ and $\pm\omega_3$ energizing six of nine potentiometers. The three others are reference potentiometers delivering voltages $-V_1$, $-V_2$, $-V_3$. The six multiplication outputs connect with neighboring amplifiers through summing resistors. Additional summing resistors connect the amplifiers to voltages expressing the components of the input vectors $\bar{Y}$. The three negative reference voltages enter capacitors joined to the amplifiers. All connections obey the integration Formulas 57 so that the terms of a scalar integrand and their negative integral output face each other across the summing resistors and capacitor tying into each amplifier. The output voltages $-V_1$, $-V_2$, $-V_3$ draw the currents of the summing resistors to the capacitors. Any potential appearing midway as an amplifier input becomes amplified and drives the motor setting the negative output (capacitor) voltage. A balanced state, wherein the amplifier input is at ground potential, is very closely maintained. The summing resistors of each group take scale values whereby their total current, as though flowing to ground, expresses a required integrand. Three such currents charge

13 the capacitors. $-V_1$, $-V_2$ and $-V_3$ are their negative integrals.

The vectorial integration is physically an independent network of apparatus performing as an operator. Vector inputs are simply integrated vectorially. Summing resistors serve to admit the vector components and as many as necessary can be had. An $\bar{A}_q \neq 0$ would enter through additional summing resistors taking component voltages $\bar{A}_q \cdot \bar{i}_1, \bar{A}_q \cdot \bar{i}_2, \bar{A}_q \cdot \bar{i}_3$.

Figure 11d is circuitry for the vectorial differentiation of $-\bar{U}' = -u_1'\bar{i}_1 - u_2'\bar{i}_2$. By Equation 37, $$-\frac{d\overline{U'}}{dt} \cdot \bar{i}_1 = -\frac{du_1'}{dt} + \omega_3 u_2'$$

$$-\frac{d\overline{U'}}{dt} \cdot \bar{i}_2 = -\frac{du_2'}{dt} - \omega_3 u_1'$$

$$-\frac{d\overline{U'}}{dt} \cdot \bar{i}_3 = \omega_2 u_1' - \omega_1 u_2' \qquad (59)$$

The terms on the right are computed.

Figure 11F:
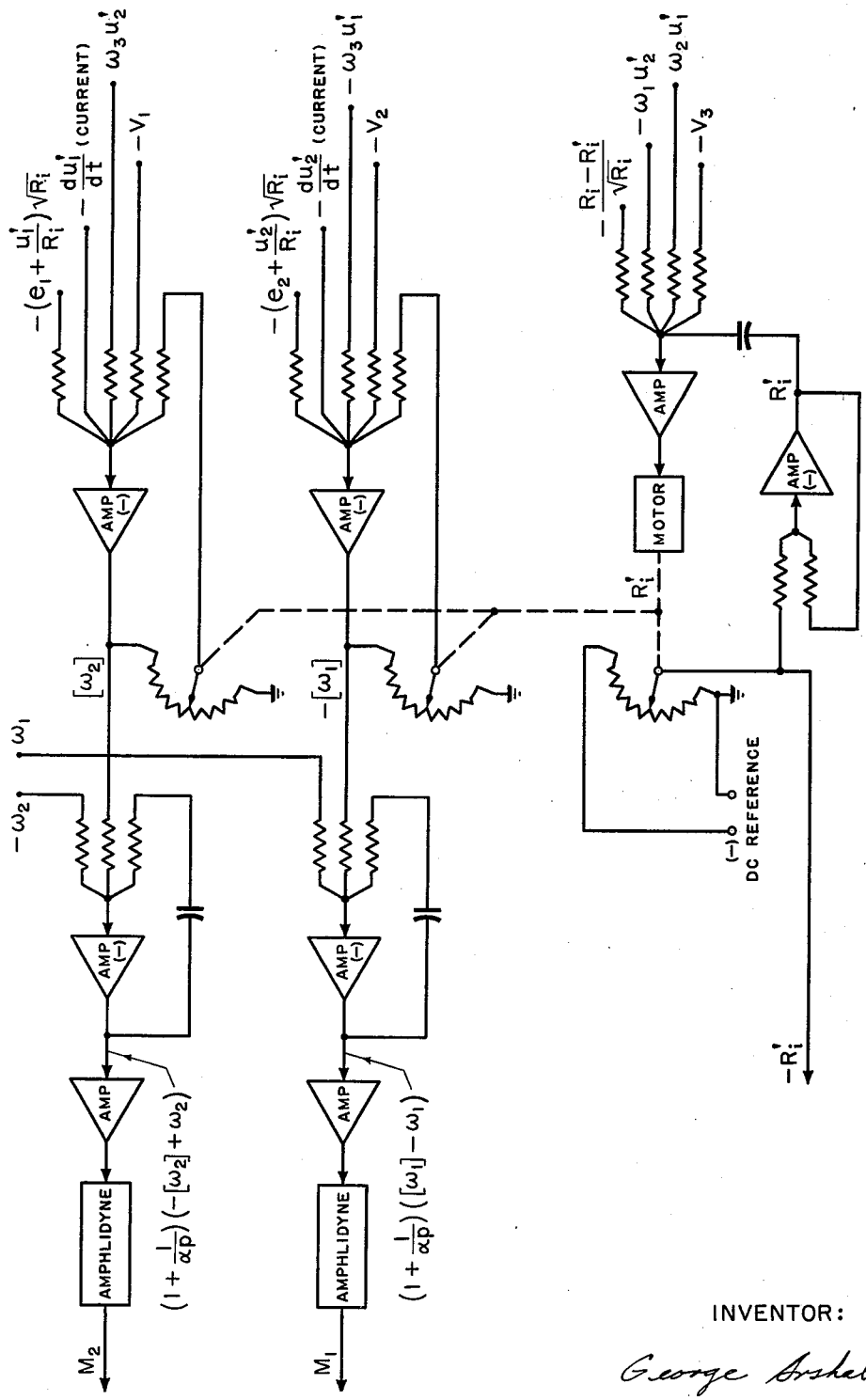

Positioning servomechanisms reproduce voltages $-u_1'$ and $-u_2'$ as equivalent shaft rotations. The shaft outputs tap the voltages $\omega_3 u_2'$, $-\omega_3 u_1'$, $\omega_1 u_2'$, $-\omega_1 u_2'$ from linear potentiometers energized with the angular rates. These voltages enter the summing resistors of amplifiers (Figure 11f), where they generate equivalent currents. Currents as $$-\frac{du_1'}{dt} \text{ and } -\frac{du_2'}{dt}$$

are generated from $-u_1'$ and $-u_2'$ in capacitors going directly to the input terminals of feedback amplifiers (Figure 11f).

Figure 11e computes as components:

$$\frac{2\zeta}{T}(\bar{R}_i - \bar{R}) = 2\zeta\sqrt{K}\frac{\bar{R}_i - \bar{R}}{\sqrt{R_i}}$$

also $$\frac{1}{T^2}(\bar{R}_i - \bar{R}) \cdot \bar{i}_3 = K\frac{R_i - R_i'}{R_i}$$

A servomechanism produces $\sqrt{R_i}$ as a shaft rotation. A linear potentiometer or linear rheostat (possibly sequencing fixed resistors with geneva mechanisms) functions as one of two summing resistors of an amplifier. It receives voltage $R_i$ through its wiper arm. The other fixed summing resistor takes feedback from a negative reference potentiometer positioned by motor. The motor also positions the variable summing resistance. The amplifier drives the motor to keep its input (grid) potential at ground. The same current flows through both summing resistors, and the output reference voltage is proportional to this current. Since the resistance to voltage $R_i$ is proportional to the output, the current relationship is $$\frac{R_i}{\text{output}} \propto \text{output} \qquad (60)$$

The output varies as $\sqrt{R_i}$.

The shaft output positions potentiometers for multiplications by $\sqrt{R_i}$. Two of the potentiometers are series connected through an intermediate feedback amplifier which isolates one from loading the other. The series performs as the feedback operator for a second amplifier taking the voltages $R_1$ and $-R_i'$ (from Figure 11f) on summing resistors. Feedback brings the amplifier input to ground, so the feedback voltage at the summing resistors is $-(R_i - R_i')$. Since this is derived from the amplifier output through multiplication by $-R_i$, the output is $$\frac{R_i - R_i'}{R_i}$$

The intermediate isolating amplifier gives $$-\frac{R_i - R_i'}{\sqrt{R_i}}$$

as output.

14

A pair of summing amplifiers receiving the voltages $$e_1, \frac{u_1'}{R_i} \text{ and } e_2, \frac{u_2'}{R_i}$$

supply their outputs across two other potentiometers positioned at $\sqrt{R_i}$. These potentiometers give $$-\left(e_1 + \frac{u_1'}{R_i}\right)\sqrt{R_i} = -\frac{\bar{R}_i - \bar{R}}{\sqrt{R_i}} \cdot \bar{i}_1$$

and $$-\left(e_2 + \frac{u_2'}{R_i}\right)\sqrt{R_i} = -\frac{\bar{R}_i - \bar{R}}{\sqrt{R_i}} \cdot \bar{i}_2$$

Figure 11f brings the outputs $$-\bar{V}, -\frac{d\overline{U'}}{dt} \text{ and } -\frac{\bar{R}_i - \bar{R}}{\sqrt{R_i}}$$

from Figures 11c, 11d, 11e respectively into final vectorial integration that performs (56) and produces $\bar{R}_i'$. The formulae for the integration are Equations 38 but with the following conditions on the output components:

$$\bar{R}_i' \cdot \bar{i}_1 = \bar{R}_i' \cdot \bar{i}_2 = 0; \quad \bar{R}_i' = R_i' \bar{i}_3 \qquad (61)$$

The input components (as $Y_1, Y_2, Y_3$, Equations 38) are $$\left(\bar{V} + 2\zeta\sqrt{K}\frac{\bar{R}_i - \bar{R}}{\sqrt{R_i}} + \frac{d\overline{U'}}{dt}\right) \cdot \bar{i}_\mu, \quad \mu = 1, 2, 3 \qquad (62)$$

For these conditions, Equations 38 become $$R_i' = \int \left(\bar{V} + 2\zeta\sqrt{K}\frac{\bar{R}_i - \bar{R}}{\sqrt{R_i}} + \frac{d\overline{U'}}{dt}\right) \cdot \bar{i}_3 dt \qquad (63)$$

$$[\omega_1] = -\frac{1}{R_i'}\left(\bar{V} + 2\zeta\sqrt{K}\frac{\bar{R}_i - \bar{R}}{\sqrt{R_i}} + \frac{d\overline{U'}}{dt}\right) \cdot \bar{i}_2 \qquad (64)$$

$$[\omega_2] = \frac{1}{R_i'}\left(\bar{V} + 2\zeta\sqrt{K}\frac{\bar{R}_i - \bar{R}}{\sqrt{R_i}} + \frac{d\overline{U'}}{dt}\right) \cdot \bar{i}_2 \qquad (65)$$

The reference frame must move with the angular space rates $[\omega_1]$ and $[\omega_2]$. The brackets designate these rates as computed quantities. The actual measured rates, $\omega_1$ and $\omega_2$, must be driven to match.

$R_i'$ is computed by a scalar integration like those of Figure 11c. The voltage signals $-V_3$, $$-\frac{R_i - R_i'}{\sqrt{R_i}}$$

$\omega_2 u_1'$, $-\omega_1 u_2'$ generate the required integrand as current through summing resistors of an amplifier. This current charges a feedback capacitor at the amplifier, to suppress its own input, drives a motor adjusting the output capacitor voltage. The adjustment passes through an isolating feedback amplifier which eliminates capacitance load on the reference potentiometer and establishes output of negative polarity, $-R\bar{i}'$, for use in Figure 11e.

Capacitance loading is present in Figure 11c. It introduces time lag between the motor shaft and reference potentiometer outputs as the exponential period of charging the feedback capacitor through the potentiometer. The lag will be small. Differences as arise between the motor shaft and voltage outputs are products of lag period and output rates of change. They represent minor errors of acceleration. Rate of change of $R_i'$, however, is velocity, which can be large. Capacitance loading could cause significant error at the motor output $R_i'$. The error would traverse the system through the computed angular rates and affect accuracy of output $\bar{V}$.

The computations $-[\omega_1]$ and $[\omega_2]$ form at amplifier outputs fed back through multiplication by $R_i'$. The amplifier holds its input near ground; external voltages supply the vector input components as current which an equivalent feedback voltage draws through a fixed resistor. The amplifier outputs are proportional to the feedback voltages divided by $R_i'$.

Comparisons $[\omega_1]-\omega_1$ and $-[\omega_2]+\omega_2$ are computed both as these differences and as integrals of these differences. Amplifiers having series capacitance, resistance feedback furnish the proportional plus integral transmissions. The integral part secures memory over past values of direct comparison and lends added precision to the control of angular rate. It is particularly of value for the control of $\omega_2 i_2$ whose axis (Figure 11a) might be highly displaced from the motor drive. The integral comparisons also sustain compensation for any static drift developed in amplification feeding back to the reference frame.

The full comparisons go to high power level through amplifiers and amphlidynes. The amphlidyne outputs, $M_1$ and $M_2$, power the motors of the reference frame (Figure 11a) to oppose the differences of comparison.

The inventor's claims are:

1. A system for filtering an input vector quantity which describes a physical phenomenon to produce an output vector representing said phenomenon and comprising means for obtaining said vector quantity as a plurality of input signals referred to a coordinate reference frame, said plurality of signals being respectively proportional to coordinates of said vector quantity in said reference frame, means including two sets of integrating means for generating said output vector as a plurality of output signals expressing said output vector in said reference frame, means generating a plurality of signals referred to said reference frame and expressing the rate of rotation of said reference frame in space, and means for supplying to the first set of said integrating means a plurality of difference signals expressing the product of a coefficient which may be variable and the difference between said input vector quantity and said output vector in said reference frame, signals from each of said first set of integrating means being combined as a vector cross product with said signals expressing the rate of rotation of said reference frame in space, the combined signals being applied to each remaining integrating means of said first set to provide vectorial integration, the second set of said integrating means performing a second successive vectorial integration of the signals from said first set to generate said output vector.

2. A system for filtering an input vector quantity which describes a physical phenomenon to produce an output vector representing said phenomenon and comprising means for obtaining said vector quantity as a plurality of input signals referred to a coordinate reference frame, said plurality of signals being respectively proportional to coordinates of said vector quantity in said reference frame, means including two sets of integrating means for generating said output vector as a plurality of output signals expressing said output vector in said reference frame, means generating a plurality of signals referred to said reference frame and expressing the rate of rotation of said reference frame in space, and means for supplying to the first set of said integrating means a plurality of difference signals expressing the product of a coefficient which may be variable and the difference between said input vector quantity and said output vector in said reference frame, each of the integrating means of said first set producing an intermediate signal which is combined as an intermediate vector cross product with said signals expressing rate of rotation of said reference frame in space, each of the intermediate cross product signals being appropriately applied to the remaining integrating means of said first set, each of said intermediate signals being supplied to a corresponding one of the integrating means of the second set which produces an output signal which is combined as a vector cross product with said signals expressing rate of rotation of said reference frame in space, each of the cross product signals of each one of said second set of integrating means being supplied to the remaining integrating means of said second set, said integrating means thus performing two successive vectorial integrations of said difference signals with respect to time in said reference frame to generate said output vector.

3. In a tracking system for establishing an output vector expressing target position in a coordinate reference frame, the combination comprising means for obtaining an input vector describing said target position as a plurality of input signals referred to said reference frame, said plurality of signals being respectively proportional to coordinates of said input vector in said reference frame, means including two sets of integrating means for generating said output vector as a plurality of output signals expressing said output vector in said reference frame, means generating a plurality of signals referred to said reference frame and expressing the rate of rotation of said reference frame in space, and means for supplying to the first set of said integrating means a plurality of difference signals expressing the product of a coefficient which may be variable and the difference between said input vector and said output vector in said reference frame, each of the integrating means of said first set producing an intermediate signal which is combined as an intermediate vector cross product with said signals expressing the rate of rotation of said reference frame in space, each of the intermediate cross product signals being appropriately applied to the remaining integrating means of said first set, each of said intermediate signals being supplied to a corresponding one of the integrating means of the second set which produces an output signal which is combined as a vector cross product with said signals expressing rate of rotation of said reference frame in space, each of the cross product signals of each one of said second set of integrating means being supplied to the remaining integrating means of said second set, said integrating means thus performing two successive vectorial integrations of said difference signals with respect to time in said reference frame to generate said output signals representing said target position as an output vector.

4. In a tracking system for establishing an output vector expressing target position in a coordinate reference frame, the combination comprising means for obtaining an input vector describing said target position as a plurality of input signals referred to said reference frame, said plurality of signals being respectively proportional to coordinates of said input vector in said reference frame, means including two sets of integrating means for generating an output vector as a plurality of output signals expressing said output vector in said reference frame, means generating a plurality of signals referred to said reference frame and expressing the rate of rotation of said reference frame in space, means measuring the inertial acceleration of said reference frame and yielding a plurality of signals referred to said reference frame and representing said acceleration as a vector, and means for supplying to the first set of said integrating means a plurality of difference signals expressing the product of a coefficient which may be variable and the difference between said input vector and said output vector in said reference frame together with said plurality of signals representing said acceleration, each of the integrating means of said first set producing an intermediate signal which is combined as an intermediate vector cross product with said signals expressing rate of rotation of said reference frame in space, each of the intermediate cross product signals being appropriately applied to the remaining integrating means of said first set, each of said intermediate signals being supplied to a corresponding one of the integrating means of the second set which produces an output signal which is combined as a vector cross product with said signals expressing rate of rotation of said reference frame in space, each of the cross product signals of each one of said second set of integrating means being supplied to the remaining integrating means of said second set, said integrating means thus performing two successive vectorial integrations of said difference signals and said signals representing said acceleration with respect to time in said reference frame to generate said output signals representing said target position as a vector.

5. In a tracking system for establishing an output vector expressing target position in a coordinate reference frame, the combination comprising means for obtaining an input vector describing said target position as a plurality of input signals referred to said reference frame, said plurality of signals being respectively proportional to the coordinates of said input vector in said reference frame, means including two sets of integrating means for generating an output vector as a plurality of output signals expressing said output vector in said reference frame, means generating a plurality of signals referred to said reference frame and expressing the rate of rotation of said reference frame in space, means measuring the inertial acceleration of said reference frame and yielding a plurality of signals referred to said reference frame and representing said acceleration as a vector, means for supplying to the first set of said integrating means a plurality of difference signals expressing the product of a coefficient which may be variable and the difference between said input vector and said output vector in said reference frame together with said plurality of signals representing said acceleration, each of the integrating means of said first set producing an intermediate signal which is combined as an intermediate vector cross product with said signals expressing rate of rotation of said reference frame in space, each of the intermediate cross product signals being appropriately applied to the remaining integrating means of said first set, each of said intermediate signals and a proportion of each said difference signals being supplied to a corresponding one of the integrating means of the second set which produces an output signal, means combining said output signal as a vector cross product with said signals expressing rate of rotation of said reference frame in space, each of the cross product signals of each one of said second set of integrating means being supplied to the remaining integrating means of said second set, said integrating means thus performing two successive vectorial integrations of said difference signals and said signals representing said acceleration with respect to time in said reference frame and a signal such vectorial integration of said proportion of said difference signals to generate said output signals representing said target position as a vector.

6. A system for filtering an input vector quantity which describes a physical phenomenon to produce an output vector representing said phenomenon and comprising means for obtaining said vector quantity as a plurality of input signals referred to a coordinate reference frame which is free to rotate in space, said plurality of signals being respectively proportional to coordinates of said vector quantity in said reference frame, means including a plurality of integrating means for generating said output vector as an output signal expressing said output vector in reference to one reference axis of said reference frame, means generating a plurality of signals referred to said reference frame and expressing the rate of rotation of said reference frame in space, means for supplying to said plurality of integrating means a plurality of difference signals expressing the product of a coefficient which may be variable and the difference between said input vector quantity and said output vector in said reference frame, each of the said plurality of integrating means producing an intermediate signal which is combined as a vector cross product with said signals expressing rate of rotation of said reference frame in space, each of the cross product signals being appropriately applied to the remaining integrating means of said plurality of integrating means, further integrating means receiving that one of said intermediate signals referring to said reference axis to generate said output signal, means receiving the intermediate signals referred to the remaining axes of said reference frame and the said output signal and providing the ratios therebetween as control signals, and means rotating said reference frame to alter said signals representing the rate of rotation of said reference frame in space about said remaining axes to make said latter signals equal to said control signals, thereby performing two successive vectorial integrations of said difference signals with respect to time in said reference frame.

References Cited in the file of this patent

UNITED STATES PATENTS

| Number | Name | Date |
|---|---|---|
| 1,788,201 | Rutherford | Oct. 14, 1930 |
| 2,385,952 | Svoboda | Oct. 2, 1945 |
| 2,476,269 | Blackman | July 19, 1949 |
| 2,493,183 | Boghosian et al. | Jan. 3, 1950 |
| 2,540,989 | Newell | Feb. 6, 1951 |
| 2,634,909 | Lehmann | Apr. 14, 1953 |
| 2,671,613 | Hansen | Mar. 9, 1954 |
| 2,704,644 | Good et al. | Mar. 22, 1955 |
| 2,715,274 | James | Aug. 16, 1955 |
| 2,762,565 | Libman et al. | Sept. 11, 1956 |
| 2,805,022 | Shelley | Sept. 3, 1957 |

FOREIGN PATENTS

| Number | Country | Date |
|---|---|---|
| 697,390 | Great Britain | Sept. 23, 1953 |
| 733,086 | Great Britain | July 6, 1955 |